July 29, 1941.  A. G. FELDMAN  2,250,990
BRAKE MECHANISM
Original Filed March 6, 1939  4 Sheets-Sheet 1
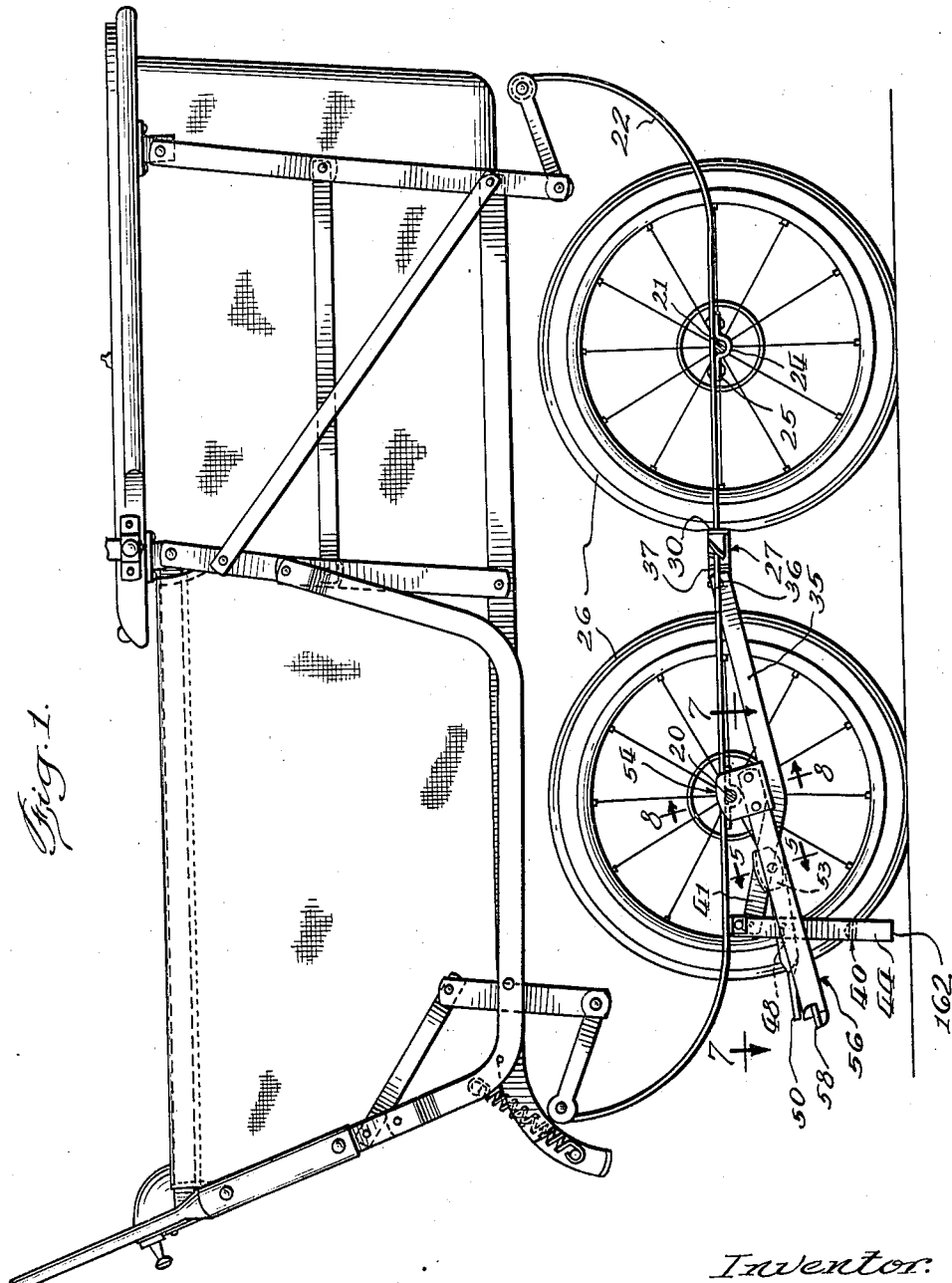
Inventor:
Abraham G. Feldman
By McCalet & Wendt
Attys.

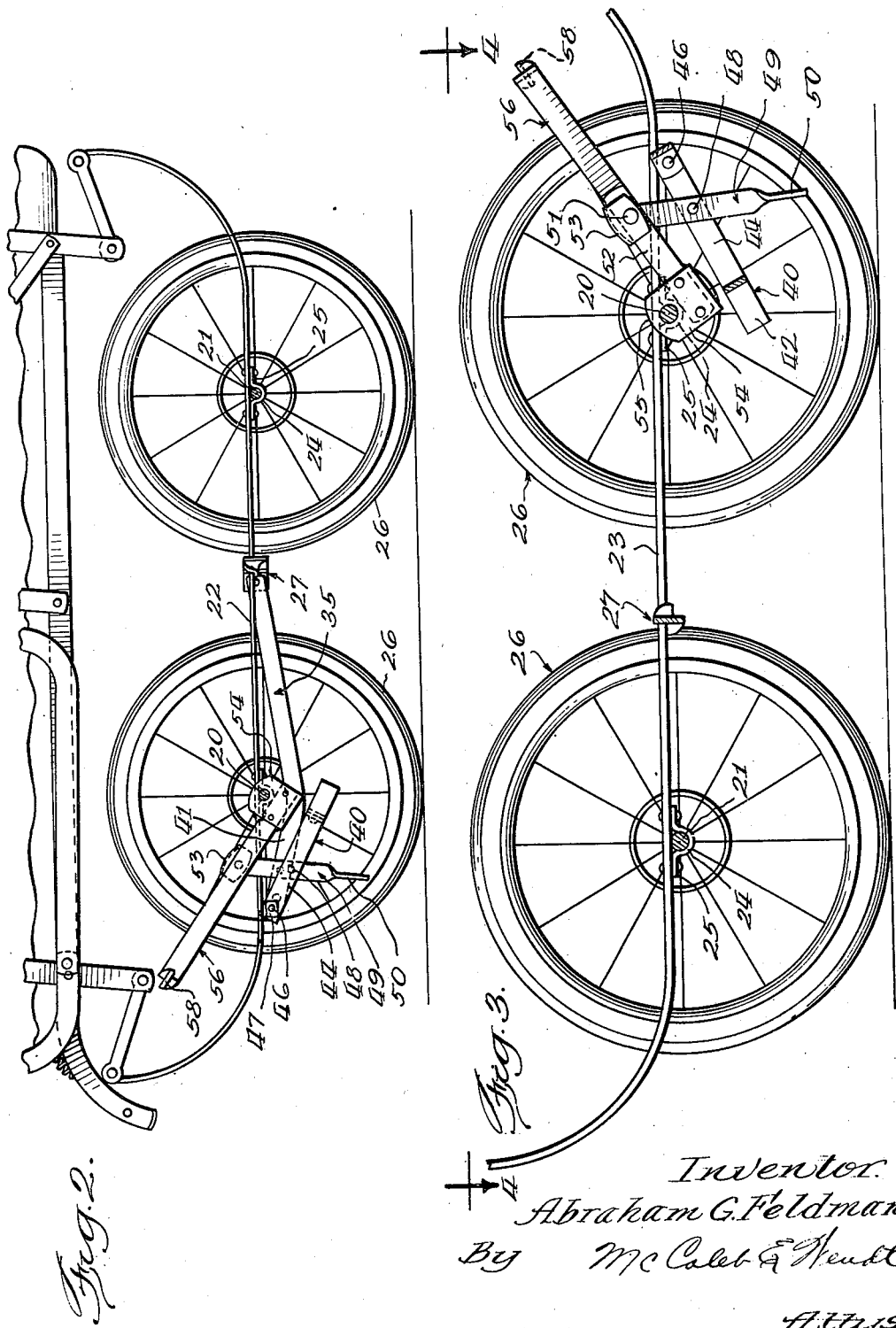

July 29, 1941.   A. G. FELDMAN   2,250,990
BRAKE MECHANISM
Original Filed March 6, 1939   4 Sheets-Sheet 3
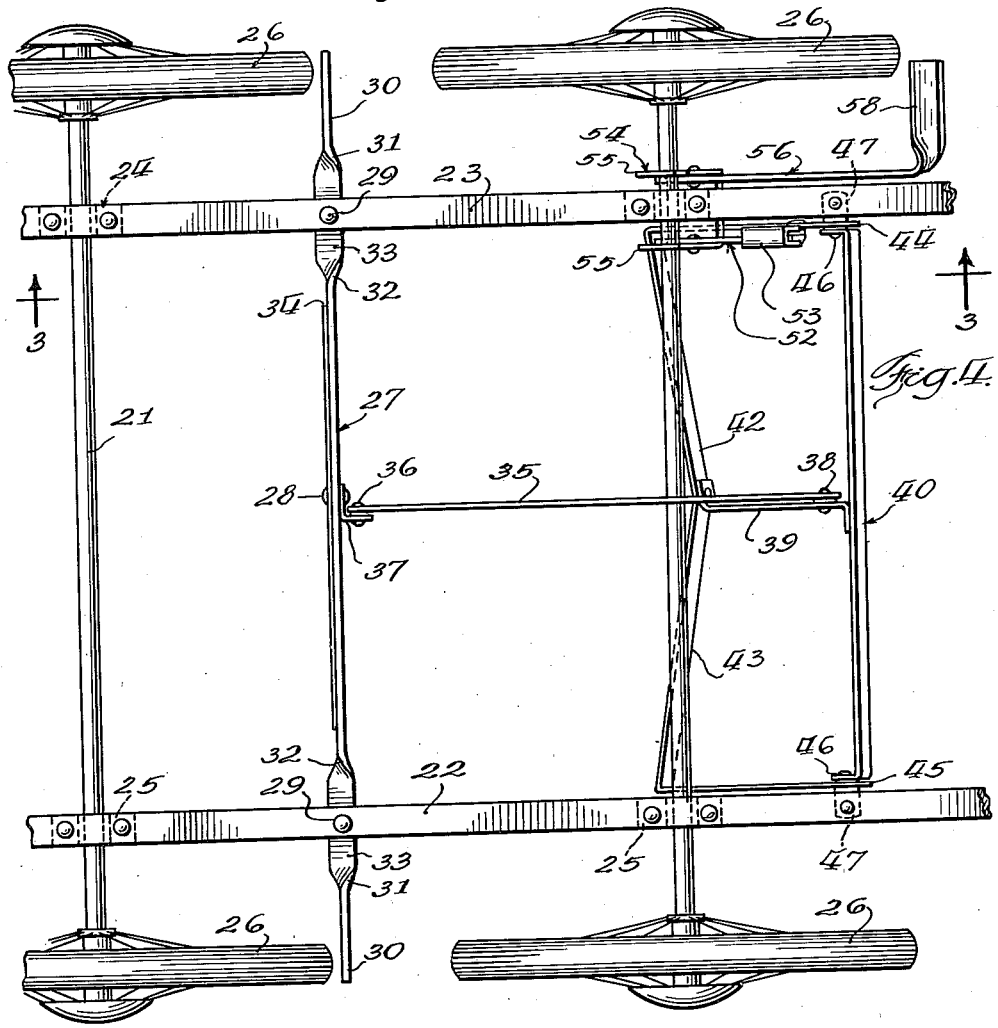

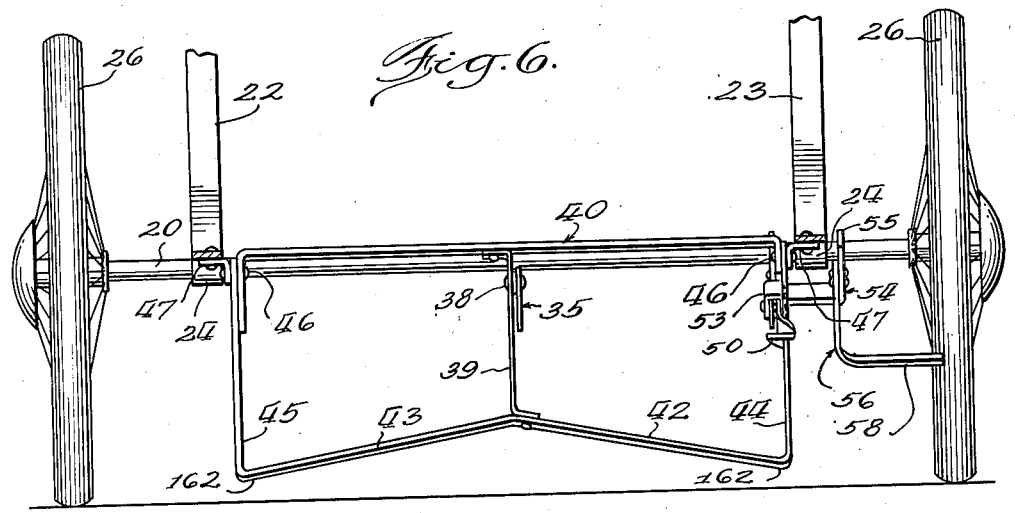
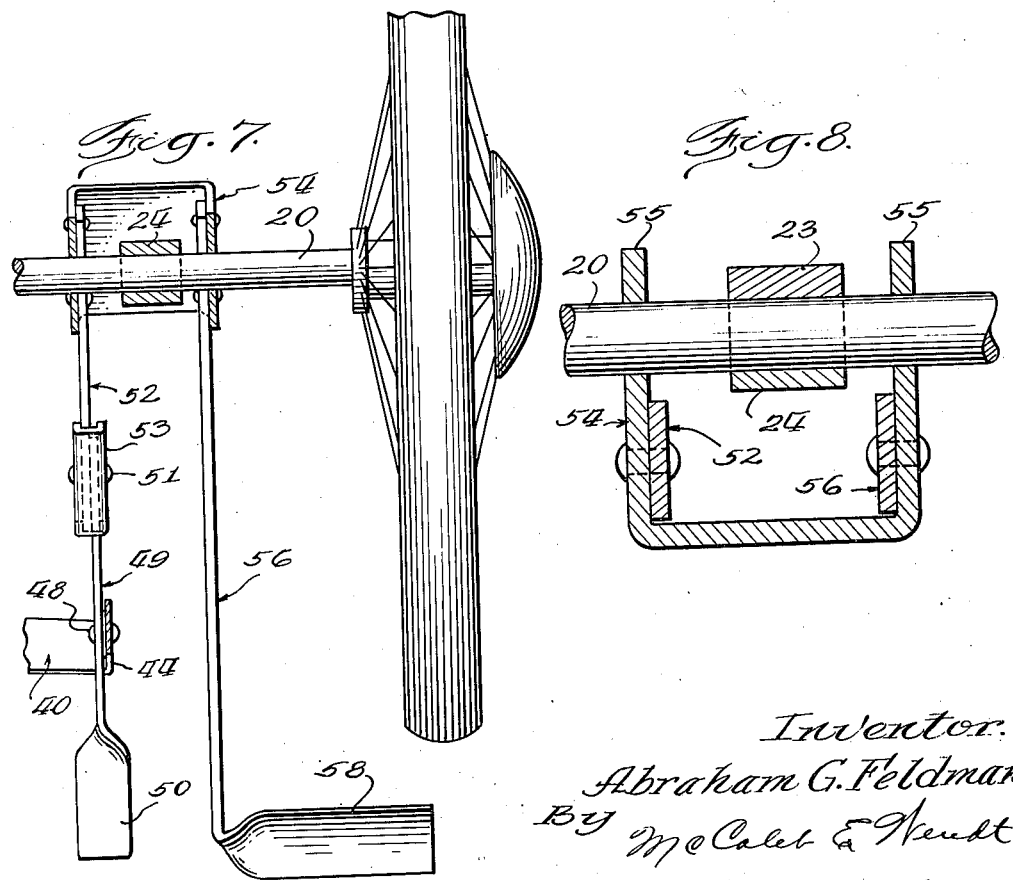

Patented July 29, 1941

2,250,990

UNITED STATES PATENT OFFICE 2,250,990

BRAKE MECHANISM

Abraham G. Feldman, Chicago, Ill., assignor to Storkline Furniture Corporation, Chicago, Ill., a corporation of Illinois Original application March 6, 1939, Serial No. 260,067. Divided and this application May 15, 1940, Serial No. 335,257

9 Claims. (Cl. 188—20)

The present invention relates to brake mechanism, and is particularly concerned with brake mechanism for baby carriages.

The present application is a division of my prior application, Serial No. 260,067, for Baby carriages, filed March 6, 1939, Patent No. 2,208,252, July 16, 1940.

One of the objects of the invention is the provision of an improved brake mechanism for baby carriages, which is equally adaptable for baby carriages of the collapsible type or carriages of the type having a rigid basket.

One of the objects of the invention is the provision of an improved brake mechanism for baby carriages which is adapted to simplify the construction of the lower wheel frame, and which is provided with separate actuating means for setting the brake and for releasing the brake.

Another object of the invention is the provision of an improved brake mechanism for baby carriages, including separate actuating members for setting and releasing the brake in the form of levers which are located rearwardly of the rear axle and toward the right of the vehicle, in position to be most readily accessible to the right foot of the operator.

Another object of the invention is the provision of an improved brake mechanism for baby carriages by means of which brakes are simultaneously applied to two wheels, including an actuating framework for the brake mechanism, by means of which forces applied with levers located at one side of the vehicle are uniformly distributed and applied to wheels on both sides of the vehicle.

Other objects and advantages of the invention will be apparent from the following description and the accompanying drawings, in which similar characters of reference indicate similar parts throughout the several views.

Referring to the drawings, of which there are four sheets,

Fig. 1 is a side elevational view of a baby carriage embodying a brake mechanism constructed according to my invention, with the brake mechanism in the braking position;

Fig. 2 is a fragmentary side elevational view of the same brake mechanism in the position which the parts assume when the brake is off;

Fig. 3 is a fragmentary sectional view, taken on the plane of the line 3—3 of Fig. 4;

Fig. 4 is a fragmentary top plan view of the brake mechanism viewed from a point below the basket and above the chassis;

Fig. 5 is a fragmentary sectional view, taken on the plane of the line 5—5 of Fig. 1;

Fig. 6 is a fragmentary rear elevational view of the rear wheels and brake mechanism, with the parts in the braking position;

Fig. 7 is a fragmentary detailed sectional view, taken on the plane of the line 7—7 of Fig. 1, looking in the direction of the arrows;

Fig. 8 is a fragmentary sectional view, taken on the plane of the line 8—8 of Fig. 1, looking in the direction of the arrows.

The chassis of the baby carriage preferably comprises a pair of wheel axles 20, 21, which may consist of steel rods, and a pair of springs 22, 23, which may consist of flat steel bands. The axles 20, 21 may be secured to the springs 22, 23 by the U-shaped metal brackets 24, each of which has a pair of laterally projecting attaching flanges 25, riveted or otherwise secured to the springs 22, 23.

The brackets 24 have the central U-shaped portion of a size adapted to fit about the axles 20, 21, and of such length that the axle is fixedly clamped to the spring 22 or 23 by bracket 24. Axles 20 and 21 are spaced on springs 22, 23 by a distance slightly greater than the sum of the radii of the wheels 26, in order that the front and rear wheels may be spaced from each other, and in order to make room for the brake mechanism.

The axles 20, 21 are of greater length than the width of the vehicle, and project beyond the springs 22, 23 at each side, in order to provide sufficient length of axle to support a wheel at each end of the rods 20, 21.

Any suitable type of baby carriage wheel may be applied, the type shown comprising a suitable metal hub rotatably mounted on the axle 20, wire spokes, a metal rim, and a solid rubber tire. The ends of the axles 20, 21 are provided with transverse apertures for receiving cotter pins, which are used with washers for holding the wheels on the axles, and the cotter pins are covered by suitable stamped sheet metal shields.

In addition to the axles and springs, the chassis also preferably includes the brake beam 27, comprising a pair of steel bands which are riveted together at the center by rivet 28 and which are secured and pivotally mounted on the springs 22, 23 by rivets 29, as shown in Fig. 3.

In order to have the brake beam in proper position to flex and engage the wheels at its flat end portions 30, it is disposed in the vertical plane and has a pair of ninety degree twisted portions 31, 32 adjacent each spring, bringing the portion 33 into parallelism with the adjacent spring to be secured by rivet 29.

The bands of which the brake beam is made overlap each other at the middle, the end of each band extending to the point 34 adjacent the opposite side of the carriage so that the brake beam is doubled in thickness throughout the major portion of the beam, to give it greater stiffness.

Rivets 29 are preferably located on the springs 22, 23 so that the end portion 30 will be closely adjacent to the front wheels when the brake beam is straight, and so that the end portion 30 may be brought into tight engagement with the wheels when the brake beam is bent backwardly.

The brake beam 27 is adapted to be actuated by a mechanism which is shown in Figs. 3 to 8. This mechanism includes a connecting rod 35, which may take the form of a flat band of steel pivotally secured by rivet 36 to one flange of an angle bracket 37, the other flange of which is carried by rivet 28 on the brake beam.

The opposite end of connecting rod or band 35 is pivotally secured by rivet 38 to the centrally located leg 39 of a pivotally mounted frame, indicated in its entirety by the numeral 40. In order to avoid interference between connecting rod 35 and axle 20 (Fig. 1), the connecting rod is bent diagonally upward at 41.

The frame 40 preferably comprises a pair of horizontal straps of metal 42, 43 joined by the three legs 44, 45, and 39, and the two end legs 44, 45 may comprise an integral part of transverse strap member 42. The end legs 44, 45 are secured to strap member 40 by having laterally turned portions which are riveted at 46 to the band 40.

The leg 39 may be made shorter than the legs 44, 45, and the side 42 may be caused to bend inward so as to form the frame with a pair of feet 162 at the right hand corners (Fig. 6) for the bottom of the frame in Fig. 1. These corners are spaced from the floor or roadway a slight distance, such as a quarter of an inch, when the frame is in the position of Fig. 1, so that the frame may serve as a guard against the upsetting of the vehicle by pivoting on the axle 20.

A pair of trunnions 46, one at each end of the frame, are riveted in the end frame members 44, 45 and pivotally mounted in angle brackets 47 carried by the springs 22 and 23.

Brackets 47 form bearings for the trunnions 46 and are riveted to the springs 22, 23 at a point rearwardly of the rear wheel axle 20. The frame 40 is thus pivotally mounted on the springs and adapted to swing downward to the position of Fig. 1, where it may also be utilized to prevent tipping of the carriage when the rear wheels are used as a pivot. The frame 40 is particularly adapted to be utilized in actuating the brake beam 27 and to take from the wheel axles 20, 21 the strain which would otherwise be placed upon them if they were used for mounting the brake actuating mechanism.

Where such brake actuating mechanism is mounted upon a relatively slender brake axle to effect a bending, there is a tendency to bow the axle and cock the wheels inward at one end. This tendency is augmented when the brake beam is relatively stiff.

In the brake mechanism constructed according to the present invention this tendency to bow the axle is eliminated by the use of a relatively stiff frame for actuating the brake mechanism.

In the present case the frame 40 is connected by a connecting rod 35 to the brake beam at the point 38 on leg 39, and the frame is adapted to be utilized to permit the location of foot pedals at any desired point; for example, in the preferred embodiment the frame 40 (Fig. 4) is pivotally connected by a rivet at 48 to a release lever 49 having a twisted extension 50, which serves as a foot pedal. The other end of the release lever 49 is pivotally connected by a rivet at 51 to a brake lever 52 (Fig. 3), which is pivotally mounted on the axle 20.

The brake lever 52 and the lever 49 are covered at the point of their pivotal connection, rivet 51, with a U-shaped stop member 53, which prevents them from passing beyond the position of Fig. 1.

Brake lever 52 is pivotally mounted on the axle 20 by means of a U-shaped stirrup 54, having an aperture in each of its legs for receiving the axle 20. The brake lever 52 is fixedly secured to the U-shaped member 54 by having its end riveted to one of the legs of the U-shaped member 54, having a pair of legs 55, and the brake lever 56 likewise has its end riveted to the opposite leg of the U-shaped member 54 by a pair of rivets. The legs of the U-shaped member 54 are disposed on opposite sides of the spring 22, and the yoke of the U-shaped member depends from the axle 20.

In effect, the brake lever 52 and the brake pedal 56 move as one lever, but the brake lever 56 is disposed outside the spring, whereas the brake lever 52 is disposed inside of the spring 22. The brake lever 56 may be turned laterally and twisted to provide a horizontally extending end portion 58 for engagement with the foot.

The operation of the brake and its mechanism is as follows: When the parts are in the position of Fig. 4, the brake is off, but the brake may be applied by merely stepping upon the lateral extension 58 of the brake pedal 56, which will cause the brake pedal 56 to pivot in a clockwise direction on the axle 20. Due to the fixed connection 54, 55 between the brake pedal 56 and the lever 52, the lever 52 pivots simultaneously in the same direction, and the lever 49 moves the frame 40 downward, the frame 40 pivoting in a counterclockwise direction, as seen in Fig. 4. This downward movement of the frame 40 continues until it reaches the position of Fig. 1, where the lever 49 and brake pedal 52 have passed the position of alignment, and the release lever 49 extends slightly upward of the end of the brake pedal, as shown in Fig. 1.

During this motion of the frame 40 the point of pivotal connection 38 of the connecting rod 35 to the leg 39 moves in an arc, as shown by the arrow in Fig. 1, and it will be noted that this point of pivotal connection 38 is slightly below the axis of pivot 46 of the frame 40. Thus the pivotal movement of the frame 40 exercises a pull on the connecting rod 35, which effects a bending backward of the middle of the brake beam 27 and a bending forward of its ends 30.

The ends 30 or shoes of the brake beam engage the front wheels 26, and thus the brake is applied to the wheels. The brake beam 27 resists this movement of the frame 40 and resists the downward movement of the brake pedal 56 until the levers 52 and 49, parts of which act as a toggle, pass the dead center position; that is, the center of pivot (Fig. 1) passes to a point below the line of centers of the axle 20 and the axis 40.

Thereafter the pull on the connecting rod 35 (Fig. 1) which is exerted by the bent brake beam 27, and the compression of the rubber on the wheels against the brake shoe 30, tends to pull the toggle 49, 52 down farther in Fig. 1, but this is resisted by the U-shaped stop member 53, the yoke of which engages both of the levers 49, 52.

It should be noted that the U-shaped stop member 53 is pivotally mounted on the rivet 51. The brake may be released by merely pressing downward with the foot upon the brake release lever at the point 50. This causes a counterclockwise movement of the brake lever 49 on the pivot 48 and tends to move the pivot 51 upward to brake the toggle.

As soon as 51 has passed the line of centers 48—20, the action of the brake beam moves the parts back to the position of Fig. 1.

The present brake mechanism has the advantage that it is positive, and without providing more than one brake beam it is possible to apply a braking force to the front wheels and also to utilize the frame member 40 to prevent tipping of the carriage.

The brake pedals in the present brake mechanism may be arranged at the side of the vehicle, where they are most conveniently operated by the foot, and they may be located rearwardly of the rear axle at a point adjacent the rear end of the basket, so that the operator can see the brake pedal and brake release pedal, and need not move backward of the carriage to peer under it when actuating these levers.

The present brake mechanism may be utilized on various types of baby carriages, including collapsible carriages and carriages having a rigid basket.

It will thus be observed that I have invented an improved brake mechanism for baby carriages, which is adapted to be applied by the use of one lever and released by another lever, both of which may be conveniently disposed at the rear of the carriage, toward the right, for actuation by the right foot. Both of these levers are actuated by the sole of the shoe, and it is not necessary to utilize the upper part of the shoe in any case, as has been necessary in some of the devices of the prior art.

The present brake actuating mechanism distributes the forces applied to the brakes uniformly to both sides of the chassis, and is adapted to operate without bending the relatively thin axles which would otherwise result in a misalignment of the wheels. The present mechanism may be manufactured at a very low cost so that its benefits may be realized by a greater number of the purchasing public.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a brake mechanism for baby carriages and the like, the combination of a chassis comprising a pair of longitudinally extending frame members with a pair of wheels supported by an axle carried by said frame members, a brake beam extending transversely of said frame members and having pivotal points of connection with said frame members, a brake actuating frame pivotally mounted on said frame members and having a connecting rod pivotally connected thereto, said connecting rod extending to a central part of said brake beam, to which it is pivotally connected, whereby the frame is adapted to actuate said brake beam and bend said brake beam at the middle to cause its ends to flex into engagement with the wheels, a brake actuating lever pivotally mounted on said chassis and having a connection to said brake actuating frame whereby the actuation of said lever is adapted to move said frame into brake actuating position, said connection including a brake release lever having a projecting extension for engagement with the foot, said extension serving as a release lever.

2. In a brake actuating mechanism, the combination of a chassis frame including a pair of longitudinally extending frame members and a pair of axles, a brake actuating frame pivotally mounted on said frame members at its ends and adapted to be moved from an upper position to a lowermost position where it is adapted to serve to prevent endwise tipping of the carriage, a brake actuating lever pivotally mounted on one of said axles and having a pivotal connection with a brake releasing lever, said brake releasing lever being pivotally secured to said actuating frame and said brake releasing lever and brake actuating lever serving as a toggle to permit application of a larger force to the brake, said pivotal connection between the brake actuating lever and brake releasing lever being provided with stop means for holding said toggle at a point past dead center in the braking position, said stop means comprising a U-shaped member carried by a pintle for pivoting brake actuating and brake releasing levers together.

3. In a brake mechanism for baby carriages, the combination of a chassis comprising a pair of springs extending longitudinally of the chassis, a pair of axles extending transversely of the chassis, wheels carried by each end of each axle, a brake beam extending transversely of the spring members and pivotally connected to each of them, said brake beam having its ends located adjacent the rims of two wheels, a pivot bracket carried by the center of said brake beam, a connecting rod pivotally secured to said bracket, a brake actuating frame having its ends pivotally secured to said springs rearwardly of the rear axle, said frame having a centrally located frame member, and means for pivotally connecting said connecting rod to said centrally located frame member whereby the movement of the brake frame applies the brake uniformly by central flexure to the two adjacent wheels, a pair of toggle levers pivotally connected together and having one lever pivotally mounted on a rear axle and the other lever pivotally mounted on said frame for holding the frame in brake actuating position.

4. In a brake mechanism for baby carriages, the combination of a chassis comprising a pair of springs extending longitudinally of the chassis, a pair of axles extending transversely of the chassis, wheels carried by each end of each axle, a brake beam extending transversely of the spring members and pivotally connected to each of them, said brake beam having its ends located adjacent the rims of two wheels, a pivot bracket carried by the center of said brake beam, a connecting rod pivotally secured to said bracket, a brake actuating frame having its ends pivotally secured to said springs rearwardly of the rear axle, said frame having a centrally located frame member, and means for pivotally connecting said connecting rod to said centrally located frame member whereby the movement of the brake frame applies the brake uniformly by central flexure to the two adjacent wheels, a pair of toggle levers pivotally connected together and having one lever pivotally mounted on a rear axle and the other lever pivotally mounted on said frame for holding the frame in brake actuating position, one of said toggle levers having an extension projecting beyond the pivotal connection with said frame serving as a release lever.

5. In a brake mechanism for baby carriages, the combination of a chassis comprising a pair of springs extending longitudinally of the chassis, a pair of axles extending transversely of the chassis, wheels carried by each end of each axle, a brake beam extending transversely of the spring members and pivotally connected to each of them, said brake beam having its ends located adjacent the rims of two wheels, a pivot bracket carried by the center of said brake beam, a connecting rod pivotally secured to said bracket, a brake actuating frame having its ends pivotally secured to said springs rearwardly of the rear axle, said frame having a centrally located frame member, and means for pivotally connecting said connecting rod to said centrally located frame member whereby the movement of the brake frame applies the brake uniformly by central flexure to the two adjacent wheels, a pair of toggle levers pivotally connected together and having one lever pivotally mounted on a rear axle and the other lever pivotally mounted on said frame for holding the frame in brake actuating position, one of said toggle levers having an extension projecting beyond the pivotal connection with said frame serving as a release lever, and stop means for holding said toggle levers in a position past dead center, comprising a U-shaped clip secured to the levers at their point of pivotal connection.

6. In a brake mechanism for baby carriages, the combination of a chassis comprising a pair of springs extending longitudinally of the chassis, a pair of axles extending transversely of the chassis, wheels carried by each end of each axle, a brake beam extending transversely of the spring members and pivotally connected to each of them, said brake beam having its ends located adjacent the rims of two wheels, a pivot bracket carried by the center of said brake beam, a connecting rod pivotally secured to said bracket a brake actuating frame having its ends pivotally secured to said springs rearwardly of the rear axle, said frame having a centrally located frame member, and means for pivotally connecting said connecting rod to said centrally located frame member whereby the movement of the brake frame applies the brake uniformly by central flexure to the two adjacent wheels, a pair of toggle levers pivotally connected together and having one lever pivotally mounted on a rear axle and the other lever pivotally mounted on said frame for holding the frame in brake actuating position, one of said toggle levers having an extension projecting beyond the pivotal connection with said frame serving as a release lever, and stop means for holding said toggle levers in a position past dead center, comprising a U-shaped clip secured to the levers at their point of pivotal connection, and a second brake actuating lever fixedly secured to one of said toggle levers in such manner as to permit a downward actuation of the brake actuating lever to apply the brakes.

7. In a brake mechanism for baby carriages, the combination of a chassis including a pair of wheels and a pivotally mounted frame with a bendable brake beam carried by said frame and having ends located adjacent the peripheries of two wheels, a pair of brake levers carried by said chassis and located rearwardly of the rear wheel, and having one side of said frame provided with operative mechanical connections between said levers and said brake beam whereby actuation of one lever is adapted to tension the brake beam and apply the brakes and secure the brakes in such position, and the actuation of the other lever is adapted to release the brakes.

8. In a brake mechanism for baby carriages, the combination of a chassis including a pair of wheel-supporting axles and wheels on said axles with means for securing said axles together and a brake shoe for engaging one of said wheels, a connecting member for actuating said brake shoe, said connecting member extending toward the rear of the chassis, said brake actuating member being pivotally connected to a transversely extending frame member, said frame member being pivotally mounted on said chassis, a toggle member pivotally mounted on said chassis and having pivotal engagement with a second toggle member, said second toggle member being pivotally secured to said transverse frame member, a stop member carried by the pivotal connection of said two toggle members for limiting their pivotal movement to a position past dead center, said brake actuating member being located adjacent the middle part of said chassis and said transverse frame member having engagement with one of said toggle members located adjacent one of the sides of the chassis.

9. In a brake mechanism for baby carriages, the combination of a chassis including a pair of wheel-supporting axles and wheels on said axles with means for securing said axles together and a brake shoe for engaging one of said wheels, a connecting member for actuating said brake shoe, said connecting member extending toward the rear of the chassis, said brake actuating member being pivotally connected to a transversely extending frame member, said frame member being pivotally mounted on said chassis, a toggle member pivotally mounted on said chassis and having pivotal engagement with a second toggle member, said second toggle member being pivotally secured to said transverse frame member, a stop member carried by the pivotal connection of said two toggle members for limiting their pivotal movement to a position past dead center, said brake actuating member being located adjacent the middle part of said chassis and said transverse frame member having engagement with one of said toggle members located adjacent one of the sides of the chassis, one of said toggle members extending rearwardly from said stop member, having an extension to be engaged by the foot for unlatching the toggle and the other of said toggle members being fixedly secured to a second lever pivotally mounted on said chassis and also extending rearwardly for engagement with the foot for effecting a latching of the toggle.

ABRAHAM G. FELDMAN.